United States Patent [19]
O'Dell

[11] Patent Number: 6,106,273
[45] Date of Patent: Aug. 22, 2000

[54] BALL MANDREL APPARATUS AND METHOD

[75] Inventor: Gregory S. O'Dell, Lewisburg, Ohio

[73] Assignee: 7345 Corp., Sylvania, Ohio

[21] Appl. No.: 09/149,338

[22] Filed: Sep. 8, 1998

[51] Int. Cl.$^7$ ............................. B29C 31/08; B29C 49/06
[52] U.S. Cl. .................. 425/534; 198/470.1; 198/803.7; 425/535
[58] Field of Search ..................... 425/526, 534; 198/470.1, 803.7, 803.8, 617; 264/537, 535

[56] References Cited

U.S. PATENT DOCUMENTS

| | | | |
|---|---|---|---|
| 3,067,861 | 12/1962 | Johnson | 198/803.7 |
| 3,083,813 | 4/1963 | Lusher | 198/803.7 |
| 3,267,643 | 8/1966 | Dardaine . | |
| 3,958,685 | 5/1976 | McDonald et al. . | |
| 4,351,631 | 9/1982 | Gessner et al. | 425/534 |
| 4,362,498 | 12/1982 | Harry et al. | 425/526 |
| 4,435,146 | 3/1984 | Wiatt et al. | 425/534 |
| 4,456,447 | 6/1984 | Smith | 425/534 |
| 4,483,436 | 11/1984 | Krishnakumar et al. | 425/534 |
| 4,572,355 | 2/1986 | Hunter | 425/534 |
| 4,678,425 | 7/1987 | Gibbemeyer | 425/534 |
| 4,684,012 | 8/1987 | Fedderson | 198/803.8 |
| 4,763,778 | 8/1988 | Fedderson et al. | 425/534 |
| 4,890,716 | 1/1990 | Kitamura . | |
| 4,890,726 | 1/1990 | Wissmann | 425/534 |
| 4,991,706 | 2/1991 | Kitamura . | |
| 5,035,603 | 7/1991 | Unterlander et al. | 425/534 |
| 5,185,163 | 2/1993 | Wiatt et al. | 425/534 |
| 5,498,152 | 3/1996 | Unterlander et al. | 425/534 |
| 5,542,526 | 8/1996 | Wurgler | 198/803.7 |
| 5,660,902 | 8/1997 | Unterlander et al. | 264/523 |

*Primary Examiner*—Robert Davis
*Attorney, Agent, or Firm*—Locke Reynolds LLP

[57] ABSTRACT

A mandrel assembly for holding a preform, including a mandrel having a collar for locating within an interior surface defined by a finish portion of the preform, a plurality of preform guides pivotably mounted to the mandrel for generally radial movement and contact with the interior surface, a plurality of resilient members for biasing the preform guides for contact against the interior surface with a preselected frictional force, so that the preform may be held by the mandrel against forces less than the preselected frictional force and the preform is capable of movement relative to the mandrel upon application of forces greater than the preselected frictional force, each resilient member attached to the mandrel and bearing against and biasing at least one of the preform guides for rotation generally radially outward. A method for holding a reorienting a preform, including engaging the finish portion with the mandrel so that the finish portion generally surrounds the collar, biasing preform guides for generally radial movement outward from the collar to bear against the interior surface with a preselected frictional force, rotating the preform with respect to the mandrel so that the preform guides are in sliding contact with the interior surface, applying a force greater than the preselected frictional force to the preform until the preform is oriented at a desired position, and holding the preform at the desired position by frictional contact of the preform guides against the interior surface.

22 Claims, 6 Drawing Sheets

BALL MANDREL APPARATUS AND METHOD

BACKGROUND OF THE INVENTION

1. Field of the Invention

This invention relates generally to mandrel apparatus for blow molding machines capable of blow molding a plastic preform into a container, and more particularly relates to mandrel apparatus capable of holding a preform in place against applied forces less than a preselected force.

2. Description of the Prior Art

Presently available mandrels used with blow molding machines are capable of loosely retaining an inverted preform over a pin or projection, with the preform capable of uncontrolled rotational movement about the pin or projection as the preform and mandrel are moved through the blow molding machine. However, with advances in blow molding machines and preforms, such uncontrolled rotation of preforms with respect to the mandrels may be undesirable, in order to assure that a preform has achieved a certain rotational orientation at a selected position during the blow molding process.

Consequently, there exists a need in the art for a mandrel apparatus that is capable of holding a preform in place with respect to the mandrel upon which it is carried, against forces less than a preselected force, yet is capable of permitting movement of the preform with respect to the mandrel to achieve a desired orientation or for removal therefrom upon application of forces greater than the preselected force.

SUMMARY OF THE INVENTION

In order to aid in the understanding of the present invention, it can be stated in essentially summary form that it is directed to a ball mandrel apparatus for a blow molding machine capable of holding a preform in place against forces less than a preselected force, but permitting the preform to move upon application of forces greater than the preselected force.

More specifically, the apparatus of the present invention is directed to a ball mandrel apparatus of a blow molding machine including a mandrel pallet having a cylindrical lower base portion, a cylindrical upper base portion, and a collar formed by a plurality of arcuate retainers disposed surrounding a central axis defined by the lower base portion and the upper base portion. Each of the retainers is formed to have a relatively wide lower portion and relatively narrow upper portion, and the retainers are arranged to define a plurality of gaps therebetween. A preform guide opening is defined by the upper base portion at each of the gaps, and is disposed generally parallel to the central axis. Each preform guide opening communicates with a roll pin bore, a tapped set screw bore, and a tapped ball spring set screw bore defined by the upper base portion generally normal to the central axis. A blow air orifice is defined through the lower base portion and upper base portion. A preform guide is pivotably disposed in each of the preform guide openings, and a roll pin is disposed through the roll pin bore and through a preform guide roll pin hole defined by a cylindrical shank portion of the preform guide. Each preform guide is pivotable about the roll pin, with an upper end of each preform guide, having a bulbous contact surface, disposed between the upper portions of adjacent retainers. The shank portions of the preform guides are disposed between lower portions of adjacent retainers, so that the upper end of the preform guides are capable of movement generally radially outward from the central axis.

Each of the preform guides is biased toward generally radially outward movement of the upper ends by a ball spring set screw threadably disposed in the ball spring set screw bore. A set screw stop is threadably engaged in each set screw bore, and a preform blow seal is disposed surrounding the retainers and in contact with the upper base portion.

In use, an inverted preform is placed by a blow molding machine over the collar so that an interior surface defined by a finish portion of the preform surrounds the container and the preform guides, with the contact surfaces in frictional contact with the interior surface of the preform, and a distal annular edge of the finish portion in sealing contact with the blow seal. By adjusting the ball spring set screws to bear against the shank portions, the preform guides contact the interior surface of the preform with a preselected frictional force, thus, the preform may be held by the ball mandrel apparatus against forces less than the preselected frictional force. In addition, the preform is capable of movement relative to the ball mandrel assembly upon application of forces greater than the preselected frictional force. In consequence, the preform is held against uncontrolled rotation as the ball mandrel apparatus moves through the blow molding machine, but permits rotational adjustment of the preform about the central axis as may be desired. The preform guides are limited in their generally radially outward movement, to permit engagement with a preform, by threadably adjusting the set screw stop with respect to the upper base portion to bear against the shank portions of the preform guides.

In a second embodiment, the preform guides may be biased for generally radially outward movement of the upper ends by springs disposed at a flattened lower end of the preform guides, and bearing against the upper ends of the preform guides and the mandrel pallet. In this second embodiment, the preform guides may define set screw bores and may be rotatably mounted to upper and lower discs with the roll pin sandwiched therebetween in a roll pin slot. In addition, the upper and lower discs may be mounted to the mandrel pallet inside the collar.

A method of the present invention for holding and orienting a preform with respect to a ball mandrel apparatus includes the steps of engaging a finished portion of the preform with the ball mandrel apparatus so that the interior surface of the finish portion generally surrounds the collar of the ball mandrel apparatus, and also includes biasing a plurality of preform guides pivotably mounted to the ball mandrel apparatus proximate to the collar for generally radially outward movement from the collar towards the interior surface so that the preform guides bear against the interior surface with the preselected frictional force, the preform guide capable of movement relative to the ball mandrel apparatus upon application of forces greater than the preselected frictional force. The biasing force may also include adjusting a plurality of resilient members attached to the ball mandrel apparatus to bear against and bias the preform guides so that a bulbous upper end of each of the preform guides bears against the interior surface. The method may further include the steps of stopping the generally radially outward rotation of the preform guides at a predetermined position, and sealing a distal annular edge of the finish portion against a preform blow seal blow seal disposed surrounding the collar.

A method of the present invention further includes the steps of rotating the preform with respect to the ball mandrel apparatus about a symmetry axis defined by the finish portion so that the preform guides are in sliding contact with the interior surface, applying a force greater than the preselected frictional force to the preform until the preform is oriented at a desired position, and holding the preform at the desired position by frictional contact of the preform guides against the interior surface. This method has particular utility for achieving a particular preselected orientation of the preform immediately prior to introduction into the blow mold for the purpose of controlling the thread finish orientation or controlling any thermal variation in the preform.

Additional features of the invention will become apparent to those skilled in the art from the following portion of the specification, taken in conjunction with the drawings, which sets forth the preferred embodiments of the present invention. The embodiments of the invention disclosed herein are the best mode contemplated for carrying out the invention in a commercial environment, although it should be understood that various modifications can be accomplished within the parameters of the present invention.

DESCRIPTION OF THE PREFERRED EMBODIMENTS

Figure 1:
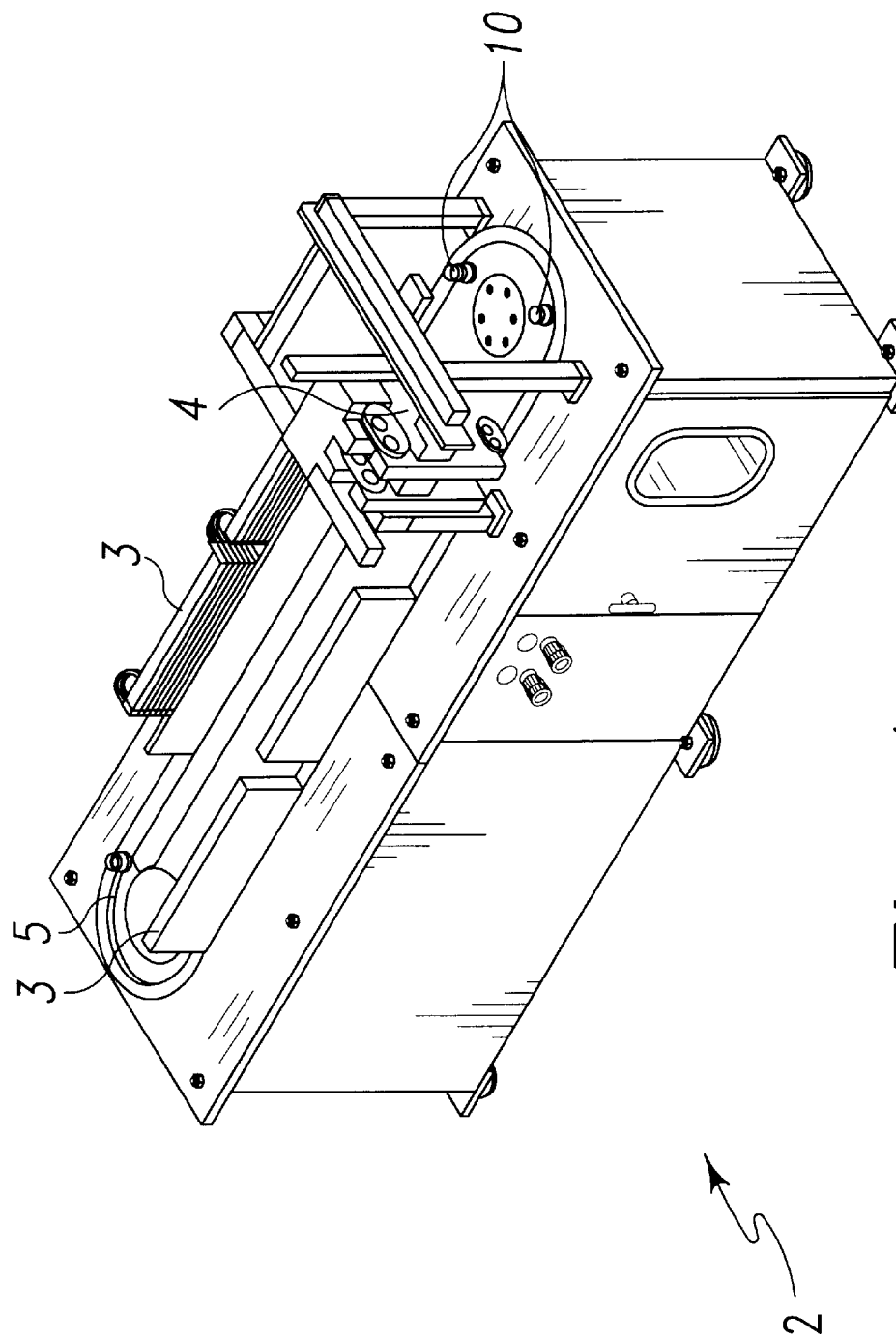
FIG. 1 is a perspective view of a blow molding machine including a ball mandrel apparatus representing the present invention.

A blow molding machine 2 is shown in FIG. 1 to include heaters 3 for heating plastic preforms to a temperature suitable for blow molding within blow mold 4. The plastic preforms are transported through the heaters 3 and blow mold 4 by a drive system 5 fashioned as an endless track. The drive system 5 includes a plurality of ball mandrel apparatus 10, each of which supports a single preform.

Figure 2:
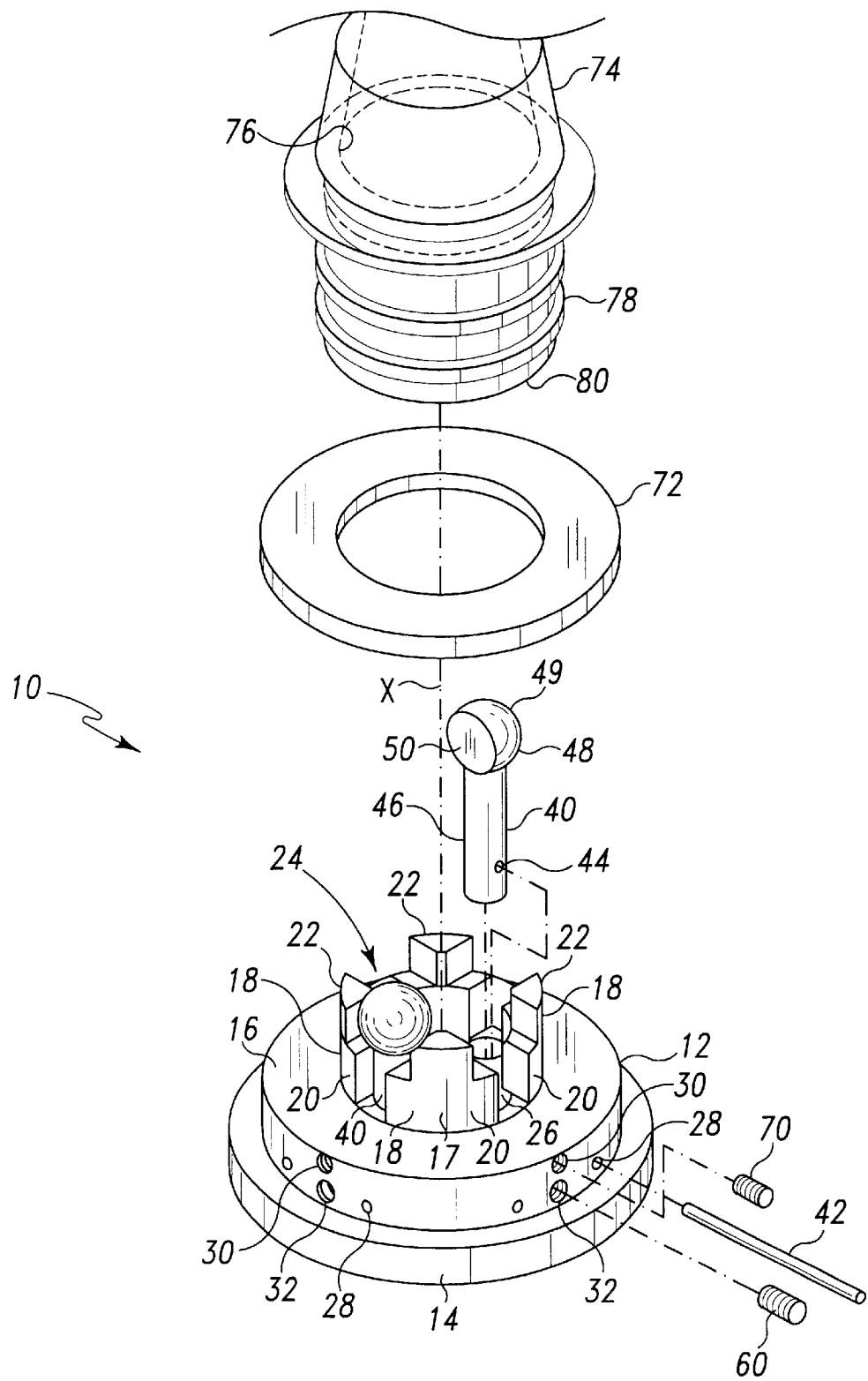
FIG. 2 is an exploded perspective view of a ball mandrel assembly representing the present invention, shown with two preform guides only.

A first embodiment of a ball mandrel apparatus 10 in accordance with the present invention is shown in FIG. 2 to include a mandrel pallet 12 having a cylindrical lower base portion 14, a cylindrical upper base portion 16, and a collar 17 formed by a plurality of arcuate retainers 18 disposed surrounding a central axis X defined by the lower base portion 14 and the upper base portion 16. Each retainer 18 is formed to have a relatively wide lower portion 20 and a relatively narrow upper portion 22, and are arranged to define a plurality of gaps 24 therebetween. A preform guide opening 26 is defined by upper base portion 16 at each gap 24, generally parallel to the central axis X. Each preform guide opening 26 communicates with a roll pin bore 28, a tapped set screw bore 30 and a tapped ball spring set screw bore 32 defined by the upper base portion 16 generally normal to the central axis X. A blow air orifice, not shown, is defined through lower base portion 14 and upper base portion 16 in alignment with the central axis X. A preform guide 40 is pivotably disposed in each preform guide opening 26, with a roll pin 42 disposed through roll pin bore 28 and through preform a guide roll pin hole 44 defined by a cylindrical shank portion 46 of preform guide 40. Each preform guide 40 is thus pivotable about roll pin 42 with an upper end 48 having a bulbous contact surface 49 disposed between the upper portions 22 of adjacent retainers 18, and shank portion 46 disposed between lower portions 20 of adjacent retainers 18, whereby each upper end 48 is capable of movement generally radially outward from the central axis X. Each upper end 48 also includes a flattened inner face 50.

Figure 3:
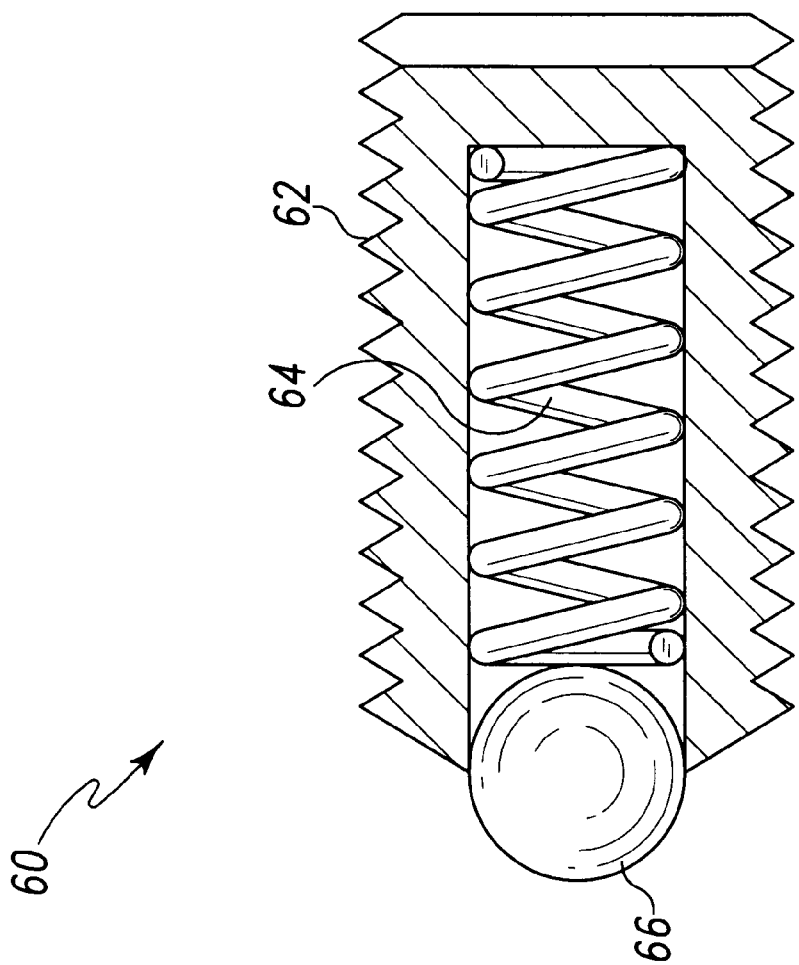
FIG. 3 is an enlarged side cross-section view of a ball spring set screw of a ball mandrel assembly representing the present invention.

Each preform guide 40 is biased towards a generally radially outward movement of upper end 48 by a ball spring set screw 60 threadably disposed in ball spring set screw bore 32. As shown in FIG. 3, each ball spring set screw 60 includes a threaded housing 62, an internal coil spring 64, and a ball 66. A set screw stop 70 is threadably engaged in each set screw bore 30, and a preform blow seal 72 is disposed surrounding retainers 18 and in contact with the upper base portion 16.

In use, an inverted preform 74 is placed by blow molding machine 2 over collar 17 so that interior surface 76 of finish portion 78 surrounds retainers 18 and preform guides 40, with the contact surfaces 49 in frictional contact with the interior surface 76, and the distal angular edge 80 of the finish portion 78 is in sealing contact with the blow seal 72. By adjusting the ball spring set screws 60 in ball spring set screw bores 32 to bear against the shank portion 46, the preform guides 40 contact the interior surface 76 of the preform 74 with a preselected frictional force. In this way, the preform 74 can be held by ball mandrel apparatus 10 against forces less than the preselected frictional force, however, the preform 74 is capable of movement relative to the ball mandrel assembly 10 upon application of forces greater than the preselected frictional force. As a result, the preform 74 is held against uncontrolled rotation as the ball mandrel apparatus 10 moves through the blow molding machine 2, but permits rotational adjustment of the preform 74 about the central axis X as desired. A set screw stop 70 can be threadably adjusted with respect to upper base portion 16 to bear against the shank portions 46 of the preform guides 40 to limit the generally radially outward movement of the contact surfaces 49 so as to permit engagement of preform 74 with the present invention.

Figure 4:
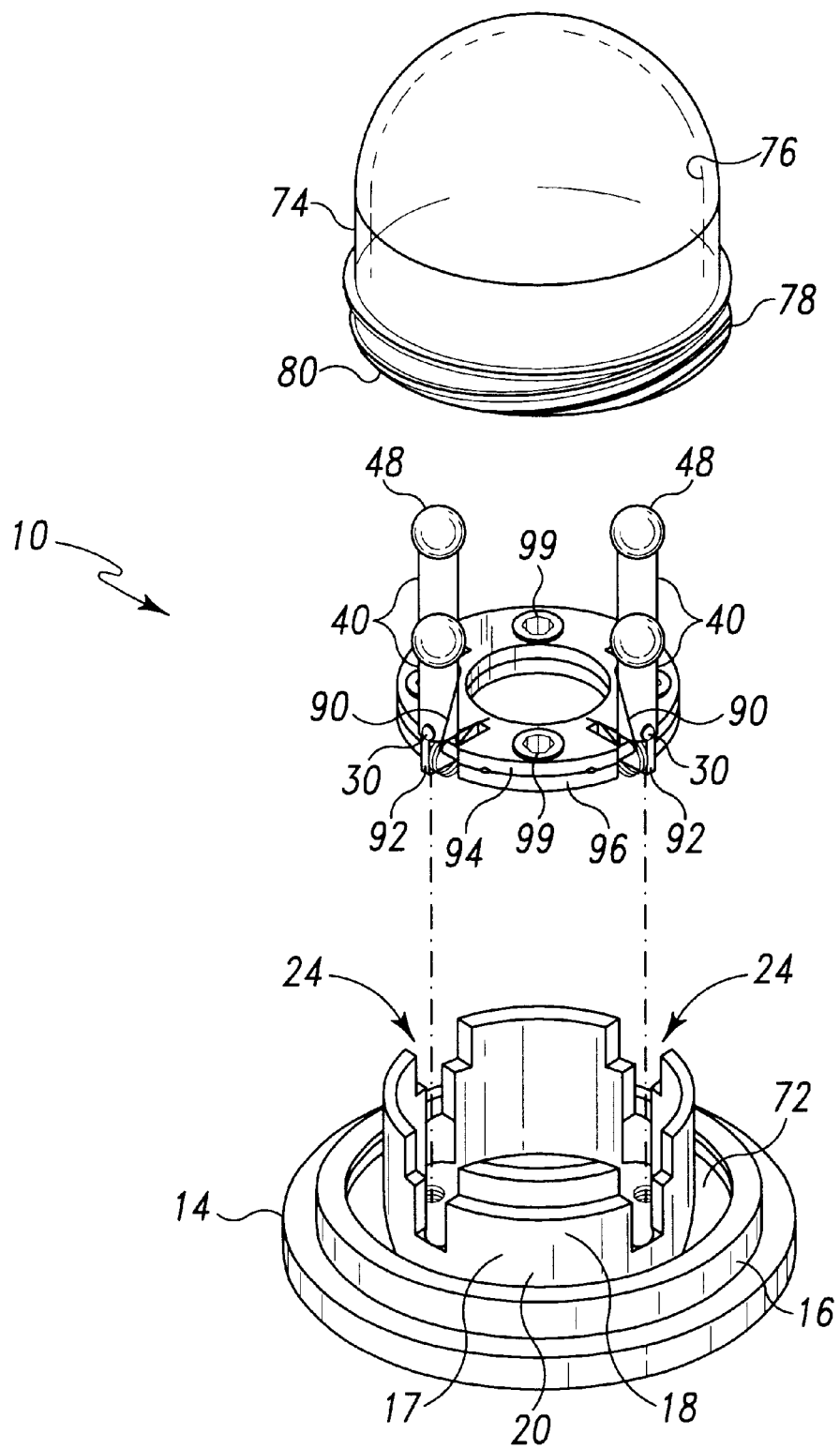
FIG. 4 is an exploded perspective view of a ball mandrel assembly representing a second embodiment of the present invention.
Figure 5:
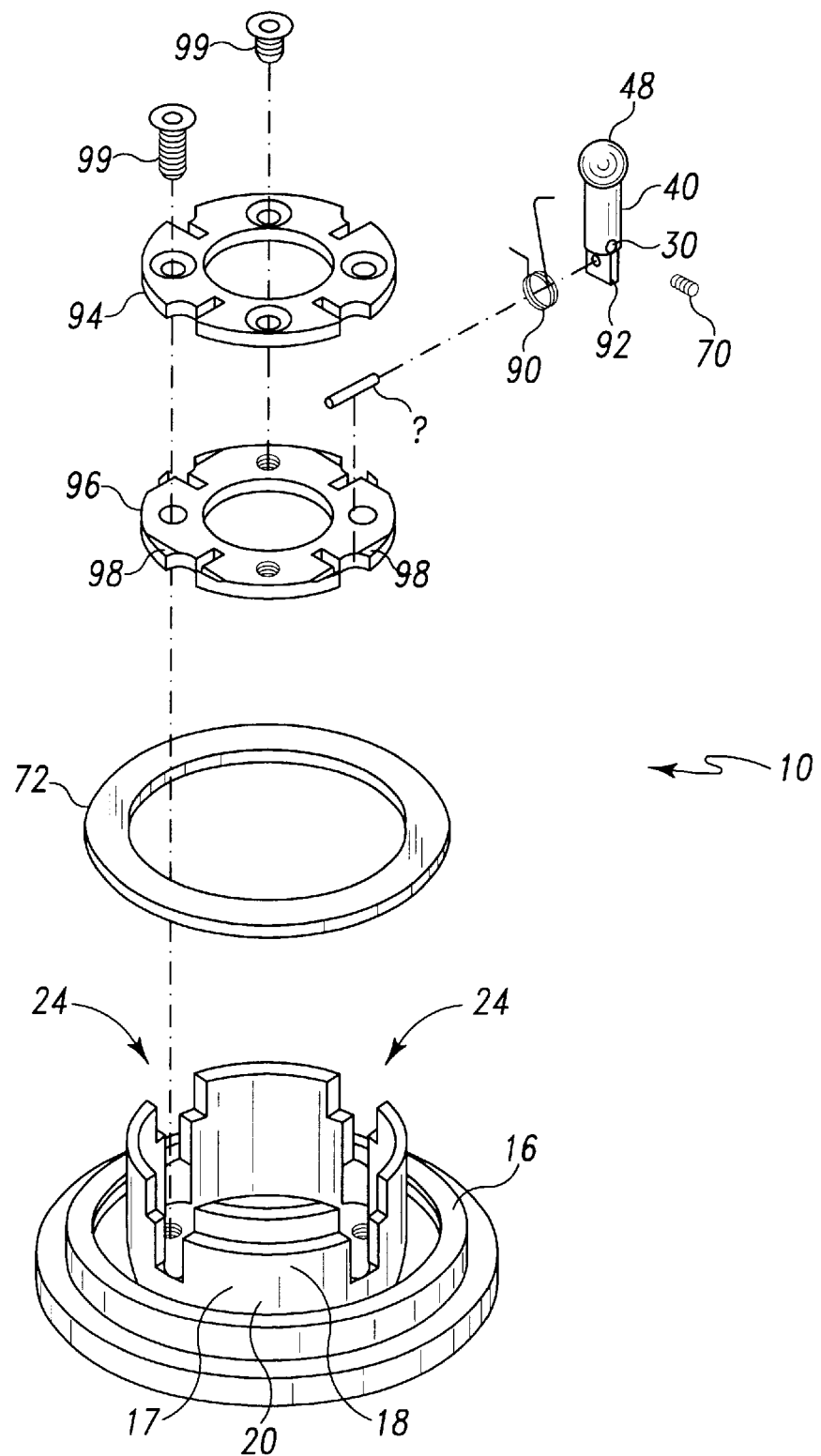
FIG. 5 is an exploded perspective view of a ball mandrel assembly representing a second embodiment of the present invention, shown with one preform guide only.
Figure 6:
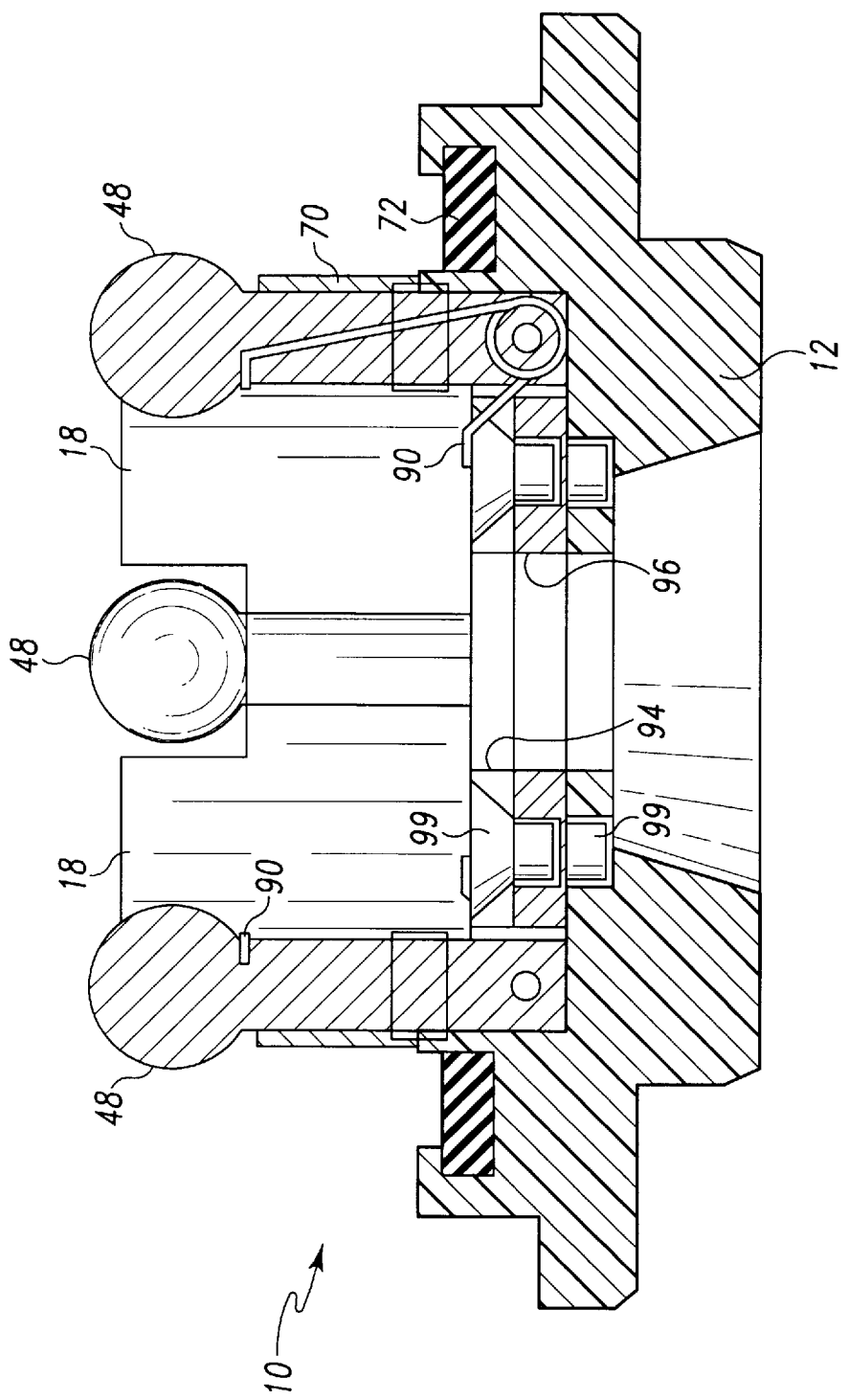
FIG. 6 is a side cross-section view of a ball mandrel assembly representing a second embodiment of the present invention.

In a second embodiment of the present invention, depicted in FIGS. 4–6, the preform guides 40 may be biased for generally radially outward movement of the upper ends 48 by springs 90 disposed at the flattened lowered ends 92 of preform guides 40 and bearing against the upper ends 48 of preform guides 40, and mandrel pallet 12. Further, in the second embodiment of the present invention, the preform guides 40 define set screw bores 30, and can be rotatably mounted to the upper and lower discs 94 and 96, respectively, with the roll pin 42 sandwiched therebetween in roll pin slot 98. The upper and lower discs 94 and 96 can be mounted to mandrel pallet 12 using threaded fasteners 99, disposed inside the collar 17 having integrally formed retainers 18.

A method of the present invention for holding and reorienting a preform 74 with respect to ball mandrel apparatus 10 includes the steps of engaging the finish portion 78 of a preform 74 with ball mandrel apparatus 10 so that the interior surface 76 defined by the finish portion 78 generally surrounds collar 17 of ball mandrel apparatus 10. The method includes the step of biasing a plurality of preform guides 40 pivotably mounted in the ball apparatus 10 proximate to the collar 17 for generally radial movement outward from collar 17 towards interior surface 76 so that the preform guides 40 bear against the interior surface 76 with a preselected frictional force, and so that the preform 74 is capable of movement relative to the ball mandrel apparatus 10 upon application of forces greater than the preselected frictional force. The biasing step can further include the step of adjusting a plurality of resilient members attached to ball mandrel apparatus 10 to bear against and the bias preform guides 40 so that the bulbous upper end 48 of each of the preform guides 40 bears against interior surface 76.

The method can further include the steps of stopping the generally outward rotation of the preform guides 40 at a predetermined position, and sealing a distal annular edge of finish portion 78 against the preform blow seal 72 disposed surrounding the collar 17.

The method further includes the steps of rotating the preform 74 with respect to the ball mandrel apparatus 10 about symmetry axis X defined by finish portion 78 so that the preform guides 40 are in sliding contact with the interior surface 76, by applying a force greater than the preselected frictional force to the preform 74, until the preform 74 is oriented at a desired position, and thereafter holding preform 74 at the desired position by frictional contact of preform guides against the interior surface 76. This method has particular utility for achieving a particular preselected orientation of the preform immediately prior to introduction into the blow mold 4.

The present invention, having been described in its preferred embodiments, it is clear that it is susceptible to numerous modifications and embodiments within the ability of those skilled in the art and without the exercise of the inventive faculty. Accordingly, the scope of the present invention is defined as set forth by the scope of the following claims.

What is claimed is:

1. A mandrel assembly for holding a preform, comprising:
a mandrel having a collar for locating within an interior surface defined by a finish portion of a preform mountable on the mandrel assembly;
a plurality of preform guides pivotally mounted to the mandrel proximate to the collar for generally radial movement and contact with the interior surface of the finish portion; and
means for biasing the preform guides for contact against the interior surface with a preselected frictional force whereby the preform may be held by the mandrel assembly against forces less than the preselected frictional force, and the preform is capable of movement relative to the mandrel assembly upon application of forces greater than the preselected frictional force.

2. The mandrel assembly as recited in claim 1, wherein each of the preform guides includes a bulbous contact service for contact with the interior surface of the finish portion.

3. The mandrel assembly as recited in claim 1, further comprising a preform blow seal disposed surrounding the collar, for sealing against a distal annular edge of the finish portion.

4. The mandrel assembly as recited in claim 2, wherein the means for biasing the preform guides includes a plurality of resilient members, each attached to the mandrel and bearing against and biasing at least one of the preform guides for rotation generally radially outward from the collar and contact with the interior surface, whereby the preform guides may be held against the interior surface with the preselected frictional force.

5. The mandrel assembly as recited in claim 4, wherein the mandrel defines a plurality of tapped openings proximate to the preform guides, and the resilient members include a plurality of ball spring set screws disposed in the tapped openings for bearing against the preform guides to urge the contact surfaces generally radially outward for contact with the interior surface.

6. The mandrel assembly as recited in claim 4, wherein the resilient members include a plurality of springs for bearing against the preform guides to urge the contact surfaces generally radially outward for contact with the interior surface.

7. The mandrel assembly as recited in claim 2 further comprising stop means for stopping the generally radially outward rotation of the preform guides at a predetermined position.

8. A mandrel pallet assembly for holding at least one preform, comprising:
a pallet;
a mandrel mounted to the pallet and having a collar for locating within an interior surface defined by a finish portion of a preform mountable on the mandrel;
a plurality of preform guides pivotally mounted to the mandrel proximate to the collar for generally radial movement and contact with the interior surface of the finish portion; and
means for biasing the preform guides for contact against the interior surface with a preselected frictional force whereby the preform may be held by the mandrel against forces less than the preselected frictional force, and the preform is capable of movement relative to the mandrel upon application of forces greater than the preselected frictional force.

9. The mandrel pallet assembly as recited in claim 8, wherein each of the preform guides includes a bulbous contact surface for contact with the interior surface of the finish portion.

10. The mandrel pallet assembly as recited in claim 8, further comprising a preform blow seal disposed surrounding the collar, for sealing against a distal annular edge of the finish portion.

11. The mandrel pallet assembly as recited in claim 9, wherein the means for biasing the preform guides includes a plurality of resilient members, each attached to the mandrel and bearing against and biasing at least one of the preform guides for rotation generally radially outward from the collar and contact with the interior surface, whereby the preform guides may be held against the interior surface with the preselected frictional force.

12. The mandrel pallet assembly as recited in claim 11, wherein the mandrel defines a plurality of tapped openings proximate to the preform guides, and the resilient members include a plurality of ball spring set screws disposed in the tapped openings for bearing against the preform guides to urge the contact surfaces generally radially outward for contact with the interior surface.

13. The mandrel pallet assembly as recited in claim 11, wherein the resilient members include a plurality of springs for bearing against the preform guides to urge the contact surfaces generally radially outward for contact with the interior surface.

14. The mandrel pallet assembly as recited in claim 9, further comprising stop means for stopping the generally radially outward rotation of the preform guides at a predetermined position.

15. A method for holding a preform against forces less than a preselected frictional force, comprising the steps of:

engaging a finish portion of a preform with a mandrel so that an interior surface defined by the finished portion generally surrounds a collar of the mandrel; and biasing a plurality of preform guides pivotally mounted to the mandrel proximate to the collar for generally radial movement outward from the collar towards the interior surface so that the preform guides bear against the interior surface with the preselected frictional force and the preform is capable of movement relative to the mandrel upon application of forces greater than the preselected frictional force.

16. The method for holding a preform against forces less than a preselected frictional force as recited in claim 15, further comprising the step of stopping the generally radial outward rotation of the preform guides at a predetermined position.

17. The method for holding a preform against forces less than a preselected frictional force as recited in claim 16, further comprising the step of sealing a distal annular edge of the finish portion against a preform blow seal disposed surrounding the collar.

18. The method for holding a preform against forces less than a preselected frictional force as recited in claim 17, wherein the biasing step includes adjusting a plurality of resilient members attached to the mandrel to bear against and bias the preform guides so that a bulbous portion of each of the preform guides bears against the interior surface.

19. A method for holding and reorienting a preform, comprising the steps of:

engaging a finish portion of a preform with a mandrel so that an interior surface defined by the finish portion generally surrounds a collar of the mandrel;

biasing a plurality of preform guides pivotally mounted to the mandrel proximate to the collar for generally radial movement outward from the collar towards the interior surface so that the preform guides bear against the interior surface with a preselected frictional force and the preform is capable of movement relative to the mandrel upon application of forces greater than the preselected frictional force;

rotating the preform with respect to the mandrel about a symmetry axis defined by the finish portion so that the preform guides are in sliding contact with the interior surface, by applying a force greater than the preselected frictional force to the preform until the preform is oriented at a desired position; and holding the preform at the desired position by frictional contact of the preform guides against the interior surface.

20. The method for holding and reorienting a preform as recited in claim 19, further comprising the step of stopping the generally radial outward rotation of the preform guides at a predetermined position.

21. The method for holding and reorienting a preform as recited in claim 20, further comprising the step of sealing a distal annular edge of the finish portion against a preform blow seal disposed surrounding the collar.

22. The method for holding and reorienting a preform as recited in claim 21, wherein the biasing step includes adjusting a plurality of resilient members attached to the mandrel to bear against and bias the preform guides so that a bulbous portion of each of the preform guides bears against the interior surface.

* * * * *